US012802858B2

(12) United States Patent
Cost et al.

(10) Patent No.: US 12,802,858 B2
(45) Date of Patent: Nov. 17, 2026

(54) SYSTEM AND METHOD FOR THERMAL MANAGEMENT OF AN INDUCTIVE WIRELESS POWER TRANSMITTER

(71) Applicant: InductEV, Inc., Malvern, PA (US)

(72) Inventors: Evan J. Cost, Audubon, PA (US); Darren A. Campo, Dowingtown, PA (US); Jerome David Frank, Villanova, PA (US)

(73) Assignee: InductEV, Inc., King of Prussia, PA (US)

(*) Notice: Subject to any disclaimer, the term of this patent is extended or adjusted under 35 U.S.C. 154(b) by 903 days.

(21) Appl. No.: 18/098,037

(22) Filed: Jan. 17, 2023

(65) Prior Publication Data

US 2024/0212909 A1 Jun. 27, 2024

Related U.S. Application Data

(60) Provisional application No. 63/435,129, filed on Dec. 23, 2022.

(51) Int. Cl.
*H01F 27/10* (2006.01)
*H01F 27/24* (2006.01)
(Continued)

(52) U.S. Cl.
CPC ............. *H01F 27/10* (2013.01); *H01F 27/24* (2013.01); *H01F 27/28* (2013.01); *H02J 50/005* (2020.01); *H02J 50/10* (2016.02)

(58) Field of Classification Search
CPC ........... H01F 27/10; H01F 27/24; H01F 27/28
(Continued)

(56) References Cited

U.S. PATENT DOCUMENTS

| | | | |
|---|---|---|---|
| 645,576 | A | 3/1900 | Tesla |
| 9,524,820 | B2 | 12/2016 | Jacobson et al. |

(Continued)

OTHER PUBLICATIONS

International Search Report and Written Opinion received in Patent Cooperation Treaty Application No. PCT/US24/11122, dated May 6, 2024.

(Continued)

*Primary Examiner* — Shawki S Ismail
*Assistant Examiner* — Joselito S. Baisa
(74) *Attorney, Agent, or Firm* — PEARL COHEN LLP

(57) ABSTRACT

A thermal management system for managing temperature of a coil assembly of a Wireless Power Transfer system uses a single low pressure liquid coolant loop to provide thermal management for longer duration charging sessions and higher power charging sessions without the need to suspend charging for cool-down. The thermal management system includes a magnetically transparent cover plate exposed to the environment, an inductive coil that generates heat during operation, a backing core layer disposed beneath the inductive coil, and a cooling system having a coolant inlet for receiving coolant, a coolant outlet for emitting coolant that has been heated by at least the inductive coil, a first cooling layer beneath the cover plate and above the inductive coil for circulating the coolant from the coolant inlet, and a second cooling layer beneath the backing core layer and connected to the first cooling layer and the coolant outlet.

23 Claims, 10 Drawing Sheets

(51) Int. Cl.
*H01F 27/28* (2006.01)
*H02J 50/00* (2016.01)
*H02J 50/10* (2016.01)

(58) Field of Classification Search
USPC .............................................................. 336/55
See application file for complete search history.

(56) References Cited

U.S. PATENT DOCUMENTS

| | | | | |
|---|---|---|---|---|
| 10,302,795 | B2 * | 5/2019 | Widmer | G01V 3/10 |
| 11,437,843 | B2 * | 9/2022 | Wu | B60L 53/14 |
| 12,184,087 | B2 * | 12/2024 | Widmer | B60L 53/124 |
| 2014/0132380 | A1 | 5/2014 | Jacobson et al. | |
| 2017/0033609 | A1 * | 2/2017 | Nakamura | H02J 50/12 |
| 2017/0338023 | A1 | 11/2017 | Ansari et al. | |
| 2018/0254136 | A1 | 9/2018 | Ueda et al. | |
| 2018/0374624 | A1 * | 12/2018 | Yuasa | B60L 3/0023 |
| 2019/0140481 | A1 * | 5/2019 | Keeling | H02J 50/12 |
| 2020/0168393 | A1 | 5/2020 | Long et al. | |
| 2021/0328443 | A1 | 10/2021 | Wolgemuth | |
| 2022/0037924 | A1 | 2/2022 | Schrafel et al. | |
| 2022/0247233 | A1 * | 8/2022 | Mohammad | B60L 53/12 |
| 2023/0246488 | A1 * | 8/2023 | Widmer | B60L 53/124<br>307/104 |
| 2024/0001790 | A1 | 1/2024 | Lee et al. | |
| 2024/0006916 | A1 * | 1/2024 | Liu | H01F 5/003 |
| 2024/0029948 | A1 * | 1/2024 | Niederhauser | H02J 50/10 |

OTHER PUBLICATIONS

LNP™ Konduit™ Compound OX11315.

* cited by examiner

Prior Art

SYSTEM AND METHOD FOR THERMAL MANAGEMENT OF AN INDUCTIVE WIRELESS POWER TRANSMITTER

CROSS-REFERENCE TO RELATED APPLICATIONS

The present application claims priority to U.S. Provisional Patent Application Ser. No. 63/435,129, filed Dec. 23, 2022. The content of that application is hereby incorporated by reference.

TECHNICAL FIELD

The present disclosure relates generally to wireless power transfer, and more specifically, to devices, systems, and methods for providing thermal management of the primary coil assembly that wirelessly transfers power to remote systems such as battery systems of electric vehicles.

BACKGROUND

Inductively coupled wireless power transfer (WPT) makes use of an air core transformer consisting of two concentric transfer coils displaced along a common coil axis. Electrical power is sent from the sending apparatus (primary assembly) to the receiving apparatus (secondary assembly) by means of magnetic flux linkage between the two transfer coils.

As elucidated in Faraday's law of induction, the first coil, the primary or transmitter, creates the time-varying magnetic field. The corresponding secondary or receiver coil converts the magnetic flux received to an electrical signal for use in powering electrical systems such as an electric vehicle or the charging system for electrical use and storage (e.g., a battery). Air-core transformers do not share a common core, but may use individual backing cores (nominally made of ferrite) situated behind the primary and secondary coils for magnetic flux redirection (as disclosed in U.S. Patent Application Publication No. 20220037924; "EFFICIENCY GAINS THROUGH MAGNETIC FIELD MANAGEMENT") rather than a shared core(s) positioned to make a complete magnetic circuit between the coils as is normal for non-air core transformers.

The WPT coil assemblies are comprised of inductors and capacitors, often designed to resonate to increase efficacy at the WPT frequency (e.g., 20 kHz, 85 kHz) (U.S. Patent Application Publication No. 20200168393; "WIRELESS POWER TRANSFER THIN PROFILE COIL ASSEMBLY" gives an alternative construction using non-discrete components). In theory, inductors do not generate heat because the energy is stored in the magnetic field then released again. Only a very small portion of stored energy is lost to the inductor's unavoidable internal resistance. Similarly, an ideal capacitor has no resistance and therefore no heat will be generated with energy being stored as an electrical field. However, with real capacitors, the dissipation factor (also known as equivalent series resistance (ESR)) is also unavoidable, causing heating.

An electrical current also generates heat as it passes through resistive elements of a circuit. The higher the resistance of a conductor, lead, or component, the more heat will be generated as current passes through it. Thus, generation of heat by the electric current as it passes through any real conductor is an inevitable consequence.

SUMMARY

Various examples are now described to introduce a selection of concepts in a simplified form that are further described below in the Detailed Description. The Summary is not intended to be used to limit the scope of the claimed subject matter.

A ground coil assembly of a wireless power transfer (WPT) system is described that includes a magnetically transparent cover plate exposed to the environment, an inductive coil that generates heat during operation, a backing core layer disposed beneath the inductive coil and having a magnetic permeability sufficient to redirect magnetic flux back towards the inductive coil, and a cooling system. The cooling system includes a coolant inlet for receiving coolant, a coolant outlet for emitting coolant that has been heated by at least the inductive coil, a first cooling layer beneath the cover plate and above the inductive coil, the first cooling layer circulating the coolant from the coolant inlet, and a second cooling layer beneath the backing core layer and connected to the first cooling layer and the coolant outlet. A gap layer may be provided between the backing core layer and the second cooling layer. The gap layer may comprise a magnetically transparent and thermally conductive material and have a width sufficient to reduce eddy current losses. An electronics board also may be provided beneath the second cooling layer. In alternate configurations, the cover plate may be thermally isolated from the inductive coil, backing coil layer, and cooling system.

In sample configurations, the cooling system further includes a third cooling layer beneath the electronics board and connected to receive the coolant from the second cooling layer and adapted to circulate the coolant to cool the electronics board before providing the coolant to the coolant outlet. A foundation layer may be disposed beneath the third cooling layer for structural anchoring of the ground coil assembly to ground around the ground coil assembly and for housing power and coolant interconnections. The foundation layer may include a metallic emissions shield that converts stray magnetic flux to heat via eddy current heating rather than allowing the stray magnetic flux to escape the ground coil assembly. The ground coil assembly may further include plumbing connected to the coolant inlet and coolant outlet. The third cooling layer may include a cold plate having connections to the plumbing.

Sample configurations of the ground coil assembly may further include a central column that passes through the inductive coil, the backing core layer, and the cooling system, and a frame around the inductive coil, the backing core layer, and the cooling system. The central column and frame may be adapted to provide structure and incompressibility to the ground coil assembly. The plumbing may be mechanically supported by and pass though the frame. The plumbing also may receive the coolant from the coolant inlet (e.g., disposed between the cover plate and the inductive coil) and direct the coolant to the first cooling layer and circulate the coolant through the first cooling layer to a drain that directs the coolant to the second cooling level. The plumbing also circulates the coolant through the second cooling layer, directs the coolant to the third cooling layer, and drains the coolant from the third coolant level to the coolant outlet. In sample configurations, the plumbing is exterior to the inductive coil and the backing core layer.

In sample configurations, inductive coil includes a plurality of concentric carrier channels of conductors, Spaces in-between conductors within the carrier channels may be filled with an electrically insulative, thermally conductive potting compound.

In other configurations, the second cooling layer is split into an inner cooling channel and an outer cooling channel separated by at least one rib that provides structural reinforcement when the inner cooling channel and outer cooling channel are pressurized. The ribs may also be used to direct coolant to areas of maximum heat production to prevent hot spots.

The ground coil assembly may further include a thermal controller that executes instructions to provide thermal management before, after, and during a charging session. The ground coil assembly also may include a database and at least one temperature sensor. In such configurations, the thermal controller receives current temperature readings from the at least one temperature sensor and executes instructions to compare the current temperature readings with a temperature model uploaded from the database. The thermal controller also may set a cooling profile in accordance with charging request parameters, activate at least one cooling element, and signal the inductive coil to commence charging in a charging session. During a charging session, the thermal controller may monitor current temperature readings from the temperature sensor, compare the current temperature readings to the cooling profile, and adjust a temperature of the coolant, activate or deactivate the cooling element, lower ground current used, and/or suspend charging in accordance with a result of the comparison of the current temperature readings to the cooling profile. The thermal controller also may provide data regarding the charging session to the database.

The inductive coil may be disposed in a magnetically transparent polymer coil carrier that is chemically inert with respect to the coolant. The polymer coil carrier also may be electrically non-conductive, magnetically transparent, have an operating temperature range of −40° C. to 125° C., and exhibit greater than 1 W/m-K in a primary direction of heat transfer.

In alternate configurations, at least one of the cooling layers may include at least one geometric 3-dimensional shape that impinges upon coolant flow to generate turbulence in the coolant. A plurality of the geometric 3-dimensional shapes may be distributed over a length and width of a cooling channel for coolant flow in a cooling layer. A size, number, distribution, and shape of the geometric 3-dimensional shapes may be selected to create a desired turbulence and pressure drop in the cooling channel.

This summary section is provided to introduce aspects of the inventive subject matter in a simplified form, with further explanation of the inventive subject matter following in the text of the detailed description. The particular combination and order of elements listed in this summary section is not intended to provide limitation to the elements of the claimed subject matter. Rather, it will be understood that this section provides summarized examples of some of the embodiments described in the Detailed Description below.

BRIEF DESCRIPTION OF THE DRAWINGS

The foregoing and other beneficial features and advantages of the invention will become apparent from the following detailed description in connection with the attached figures, of which.

DETAILED DESCRIPTION

A detailed description of illustrative embodiments will now be described with reference to FIGS. 1-14. Although this description provides a detailed description of possible implementations, it should be noted that these details are intended to be exemplary and in no way delimit the scope of the inventive subject matter.

In a modular wireless power transfer (WPT) system, each pad in a WPT charger is independent both for ease of manufacturing and sustained operational use in the event of a single pad failure. A modular WPT system may use a ground vault with 1, 2, 4, or 6 sockets, each socket with a resident WPT charger. Common arrangements of modular WPT chargers are 1, 2×1, 1×2, 2×2, and 2×3 to fit various vehicles and WPT receiver arrangements and geometries. The modularity and independence of WPT chargers may be applied to the cooling system as well with 1-to-1 or 1-to-many cooling systems to WPT chargers. The WPT charger's exemplary Ground Coil Assembly (GCA) includes the inductive coil, coolant layers, magnetic core, eddy current shield and capacitors for wireless power transfer from the primary to the secondary over an air gap.

Use of a single pass, constant low pressure liquid coolant system for the WPT GCA minimizes potential coolant leaks while maximizing service life of mechanical components (e.g., pump(s), fans(s), valves). Alternatively, a variable speed pump may be used to boost pressure up to a set (e.g., 30 PSI) or cavitation limit (either by the pump or within the GCA cooling channels) to maximize coolant flow but limiting erosion of polymer components.

The inherent heat generation, thermal conductivity, and thermal limits of the GCA internal component layers both inform and constrain the cooling system design and operation. Liquid coolant components were selected for both useful service temperature range and environmental safety.

The following description provides configurations for cooling the GCA as a result of heat generated during use. Sample cooling configurations will be described below with respect to FIGS. 1-14.

FIG. 1

Figure 1:
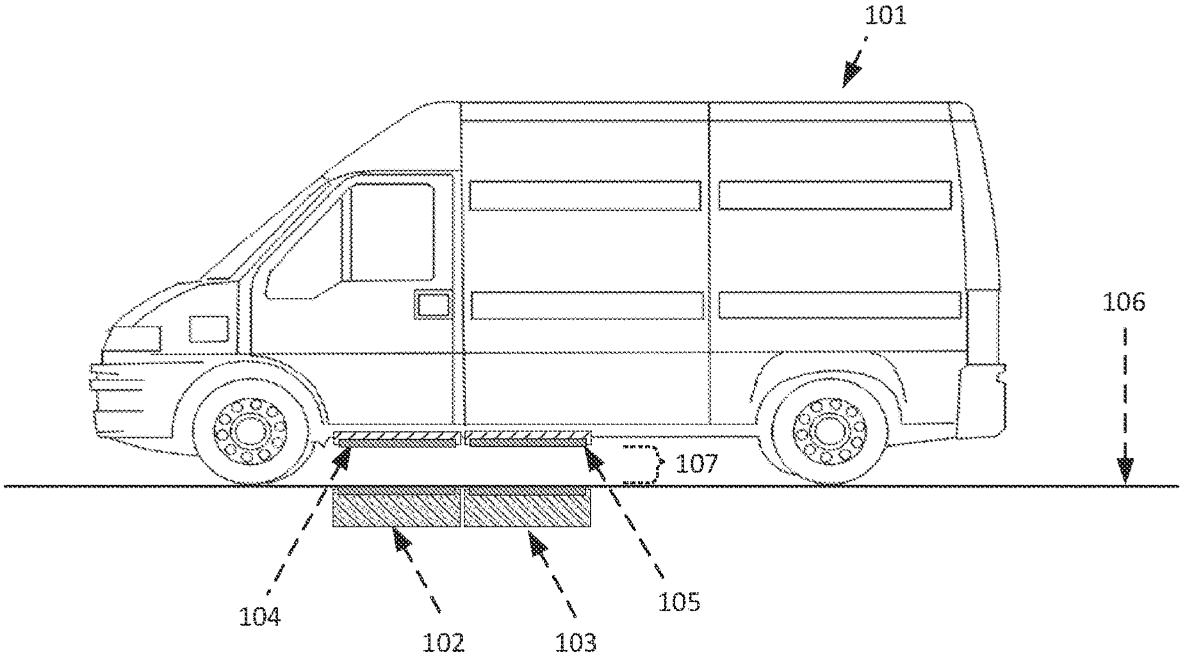
FIG. 1 is a diagram illustrating a Wireless Power Transfer (WPT) system in a vehicular charging application.

FIG. 1 is a diagram illustrating a WPT system in a vehicular charging application. In the FIG. 1 example, a stationary electric vehicle (EV) 101 is shown wirelessly charging. Wireless charging can also be used for parked EVs, temporarily stopped EVs (also known as opportunity charging), and for moving EVs (also known as dynamic charging). Wireless charging can be made bidirectional with the addition of parallel charging and discharging circuitry on the vehicle and ground station as the magnetic coupling can function in either direction.

In the FIG. 1 example, a modular wireless charger is shown with a first ground station 102 and a second ground station 103. Each ground station 102, 103 contains the inductive coil assembly and supporting circuitry to enable wireless power transfer. Physically symmetric vehicle stations 104 and 105 are shown mounted to the underside of the EV 101 chassis. The ground stations 102 and 103, mounted on, or socketed into, the pavement surface 106, are separated from the vehicle stations 104, 105 by an air gap 107.

FIG. 2

Figure 2:
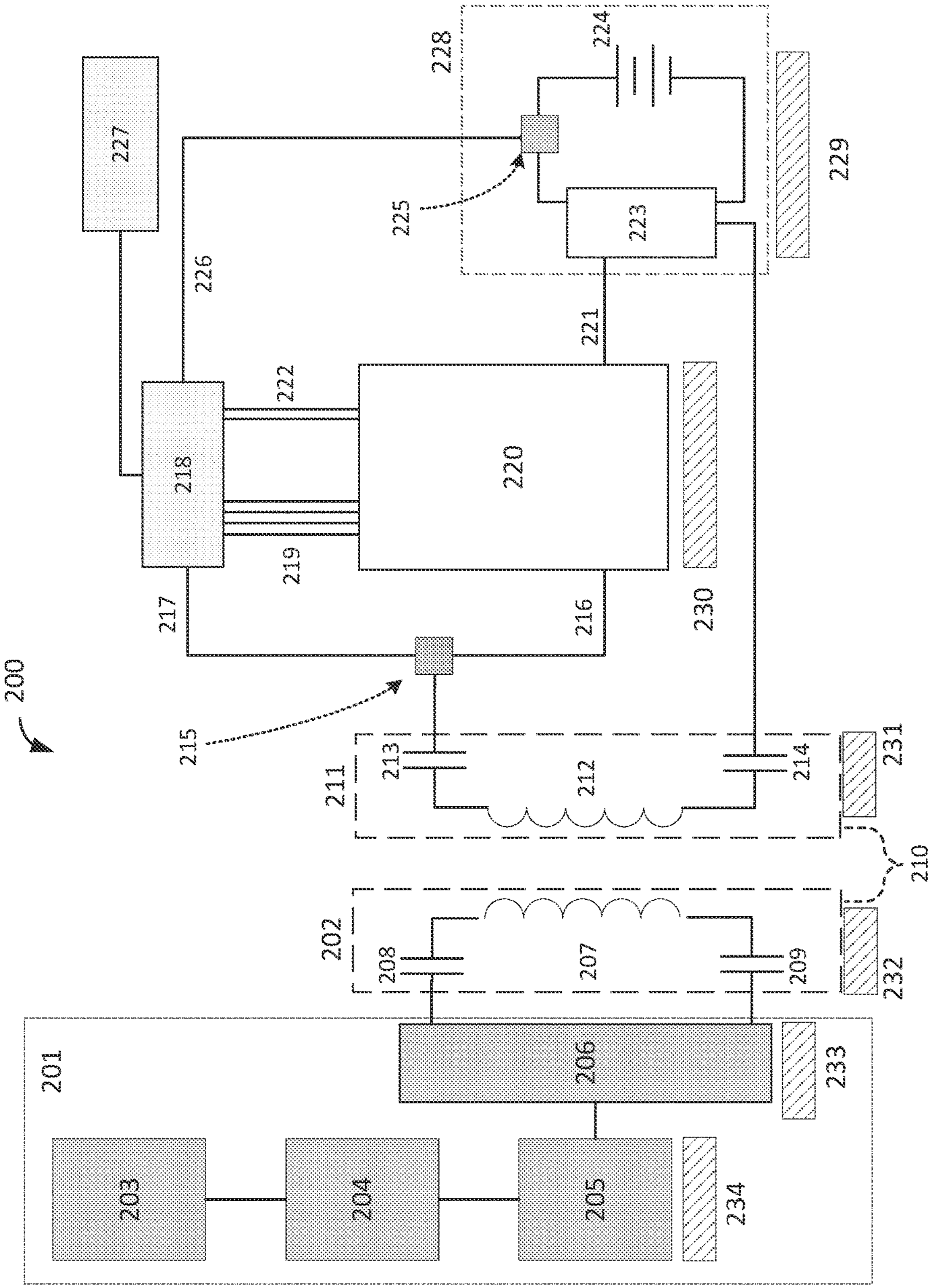
FIG. 2 is a diagram of a high-level design for an inductive high-power WPT system with active and passive heat management elements for use with electric vehicles (EVs) with battery storage in a sample configuration.

FIG. 2 is a diagram of a high-level design for an inductive high-power WPT system 200 with active and passive heat management elements for use with EVs with battery storage in a sample configuration. In this system, the ground-side electronics 201 provides a conditioned power signal to the primary coil assembly 202. The ground side electronics 201 include in this example an interface to the utility grid 203, power factor correction (PFC) circuitry 204, an AC/DC converter 205, and a DC/AC inverter 206.

As preferred in high power systems, the primary coil assembly 202 may have a balanced series-series configuration including the primary coil windings 207 with matched capacitors 208 and 209. Across an airgap 210, the secondary coil assembly 211 includes a secondary coil winding 212 that receives the magnetic signal generated by the primary coil winding 207. The secondary coil assembly 211 also may have the balanced series-series configuration including the secondary coil windings 211 and matched capacitors 213 and 214. In the secondary coil assembly 211 (as detailed in U.S. Patent Application Publication No. 20200168393; "WIRELESS POWER TRANSFER THIN PROFILE COIL ASSEMBLY"), the resonant elements are not discrete components but a unique form of distributed reactances that form a resonant circuit.

The AC power level, frequency, and phase (i.e., the AC power signal data) generated by the secondary coil assembly 212 is measured by a sensor 215 in the secondary-to-rectifier bus 216 which reports these measurements via digital datalink 217 to the active rectifier controller (ARC) 218. The ARC 218 may use the AC signal data to predictively model the signal to determine zero crossings to optimize the active rectification. Rectification control signaling is passed via control links 219 to the active rectifier 220, which takes the AC signal from the secondary-to-rectifier bus 216 and converts the AC input to a DC power output 221.

Alternately, rectifier 220 can be a passive rectifier. Examples of the passive rectifier implementation can be found in U.S. Patent Application Publication No. 20210328443; "SAFETY CIRCUITS FOR WIRELESS POWER TRANSFER".

Temperature sensors in the rectifier module 220 (not shown) use digital datalinks 222 to report the measured temperatures to the ARC 218. The power conditioner 223 takes the rectifier DC output 221 and removes ripple and noise to charge the battery pack 224. The conditioned DC signal characteristics are monitored by a sensor 225 and reported back to the ARC 218 via digital datalink 226. The ARC 218 reports both AC and DC power characteristics to a networked controller 227 for storage, coordination, and reporting.

The high-power components of the WPT will require cooling during operation. The EV power electronics 228 (the EV battery pack 224 and other vehicle systems) will require its own cooling solution, in this example forced air cooling through a heat exchanger 229.

The WPT rectifier 220 cooling may be shared with the EV heat exchanger 229 or a separate heat exchanger 230 may be used (shared with the accessory electronics 218 and 227). The secondary coil assembly 212 cooling is shown here using a distinct heat exchanger 231, but the vehicle heat exchanger 230 may be shared to cool the secondary coil assembly 211. No cooling connection between the ground-side and vehicle-side is shown in this exemplary system.

The ground-side primary coil assembly 202 may have its own dedicated heat exchange mechanism 232 for cooling. The inverter 206 also requires cooling, shown here as provided by the heat exchanger 233. The AC/DC converter 205 will also generate heat in normal operation, thus requiring cooling by heat exchanger 234.

The inverter 206 and AC/DC converter 205 also may share a cooling system with each other and the other ground-side electronics systems. Since the primary coil assembly 202 can be deployed a distance away from the rest of the groundside electronics 201, distinct and independently scalable cooling elements may be needed.

FIG. 3

Figure 3:
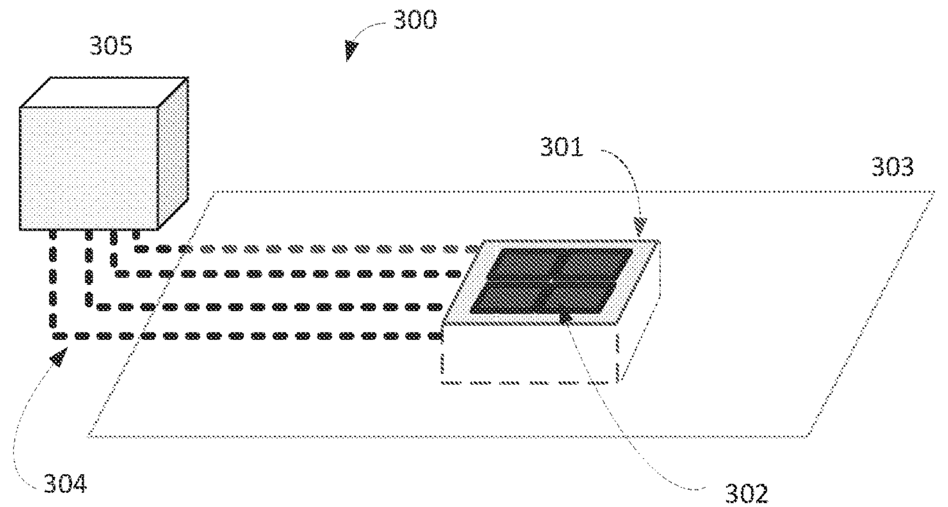
FIG. 3 is a diagram illustrating the major components and interconnections of a modular charger installation in a sample configuration.

FIG. 3 is a diagram illustrating the major components and interconnections of a modular charger installation in a sample configuration. The modular charger installation 300 may be part of an in-ground WPT ground station as depicted in FIG. 3. A vault 301 provides the shell to hold the WPT 302 (in this example, a modular four socket, four pad system). The vault 301 is embedded in the pavement 303 and the power, communications, and cooling connections 304 to the ancillary module 305 are underground.

Not shown is a surface mounted WPT ground station installation option which, along with its armored communications, cooling, and power connections to the ancillary module 305, may rest affixed to the surface of the pavement 303.

FIG. 4

Figure 4:
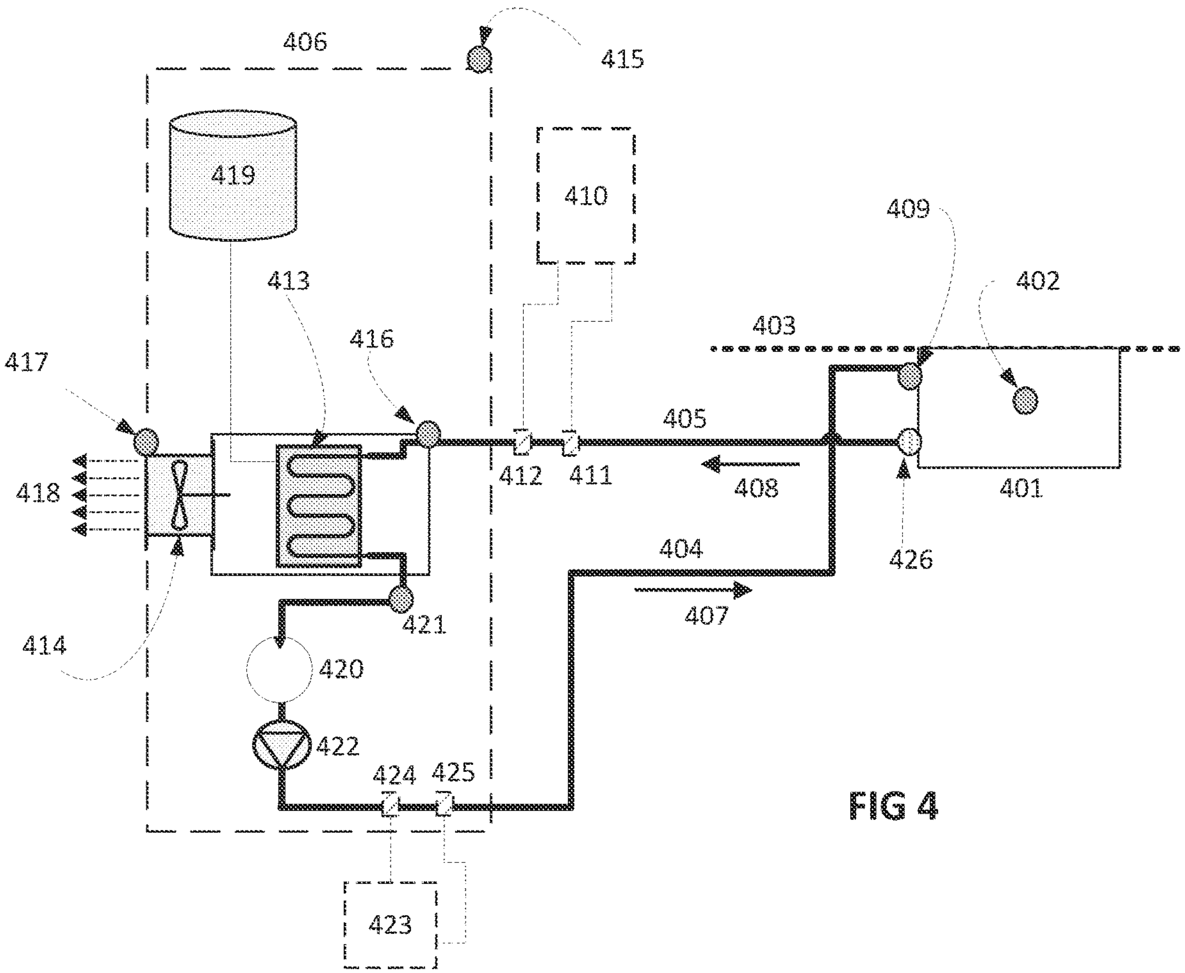
FIG. 4 is a schematic diagram of an actively cooled WPT system in a sample configuration.

FIG. 4 is a schematic diagram of an actively cooled WPT system in a sample configuration. In the high-level design for the thermal management of a WPT system as shown in FIG. 4, the ground assembly resides in a vault 401. Temperature sensor(s) 402 may monitor the temperature of the vault 401 and each modular ground coil assembly (not shown) socketed into the vault 401 has individual temperature sensors 402. The vault 401 is installed below grade with the ground coil assembly cover mounted to be flush or slightly below the pavement level 403. Note that non-flush, pavement mounted installation of ground coil assemblies are an installation option. The pavement mounted ground coil assemblies will also have internal temperature sensors as will the protective housing.

For redundancy, with soft-fail, each installed ground coil assembly has a dedicated cooling system with unique incoming 404 and outgoing 405 coolant pipes between the vault 401 and ancillary equipment cabinet 406. Alternatively, a shared cooling system may be provided for multiple charging pads (e.g., a cooling system for every 4-8 charging pads) in a ground coil assembly. The power and communications links between the vault 401 and the ancillary equipment cabinet 406 are not shown in FIG. 4.

The macro cooling loop shown in FIG. 4 starts with the incoming coolant pipe 404 with the flow of chilled coolant 407 moving into the ground coil assembly within the vault 401. The heated coolant flow 408 that has been heated by the ground coil assembly components passes through the outgoing coolant pipe 405. The temperature of the heated coolant flow 408 is monitored by a temperature sensor 409. Optional passive or semi-active cooling elements 410 may be installed on the outgoing cooling pipe 405 at 411, 412 to chill the coolant 408 before reaching the ancillary equipment cabinet 406.

In this example, once reaching the ancillary equipment cabinet 406 the heated coolant 408 is passed through a forced air-cooled heat exchanger 413. The speed of one or more fan units 414 is controlled by the ambient air temperature (as determined by ambient temperature sensor 415, the heated coolant temperature sensor 416, and the air exhaust temperature sensor 417 to exhaust air 418. A thermal expansion tank 419 serves both to maintain coolant pressure and circulating volume.

Note that both the coolant flow rate and coolant pressure are measured to assess flow distribution, pipe blockage, leaks using one or more sensors (not shown).

The post heat-exchanger chilled coolant 407 may be routed through a secondary cooling element(s) 420 (e.g., passive, semi-active, or additional active chillers or combinations thereof) to achieve the desired coolant temperature (as determined by temperature sensor 421. The chilled coolant 407 is pressured by the pump 422 and then delivered to the vault 401 by the incoming coolant pipe 404. Optional passive or semi-active cooling elements 423 may be installed on the incoming cooling pipe 404 with optional valves 424 and 425 to further chill the coolant 407 before reaching the vault 401. An optional temperature sensor 426 may be included on the vault entry of the incoming coolant pipe 404 if additional optional passive or semi-active cooling elements 423 are deployed.

The pump 422 may be a continuous pressure pump. The pump 422 may have defined ramp-up and ramp-down pressure changes to prevent pressure spikes in the coolant 407. The pump 422 also may be a variable pressure type with feedback from one or more cavitation sensors (shown in FIG. 14 as 1406) to control pressure drops as to prevent excessive wear to the polymer components of the first cooling layer (shown in FIG. 7 as 703). Cavitation may also be prevented by calculated limits imposed on pump speed and system pressure.

FIG. 5

Figure 5:
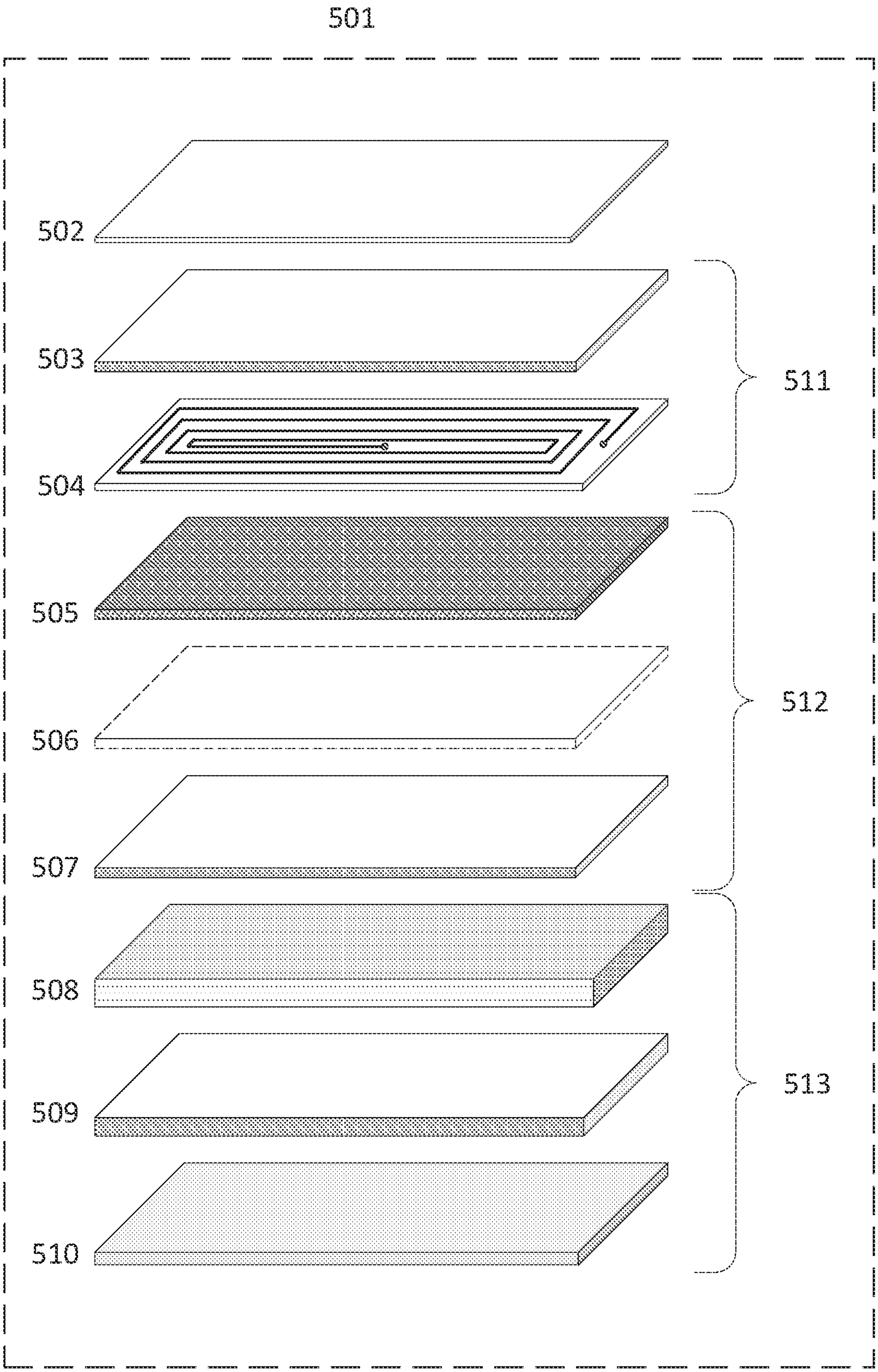
FIG. 5 is an exploded view of a ground coil assembly of a ground charger module of a WPT system in a sample configuration.

An exploded view of a ground coil assembly 501 of a ground charger module of a WPT system is shown in FIG. 5. Structural elements as well as electrical connections and fluid interconnections have been omitted for clarity. The ground coil assembly 501 is a sealed unit so heat propagation is expected from conduction rather than convection or radiation.

As illustrated in FIG. 5, the topmost layer is the cover plate 502. Exposed to the environment and driven over by vehicles, the cover plate 502 in addition to being magnetically transparent, must also be tough to endure loading an abrasion as well as being weather and sun resistant. Since the cover place plate 502 is also the only exposed element, it must be compliant with the UL60950-1 Standard/IEC 60950-1 standard to prevent momentary contact burns.

The first cooling layer 503 lies beneath the cover plate 502 and above the inductive coil tray 504, which generates heat. The first cooling layer 503 circulates the chilled coolant as it first enters the ground coil assembly 501. Since the cover plate 502 maximum temperature is set by international standards, the conducted heat from the lower assembly layers must be managed to prevent excess heat from reaching the cover plate 502. It will be appreciated that the cover plate 502 also may be thermally isolated from the rest of the assembly to avoid excess heating and in some cases mitigate parasitic heating (e.g., from insolation) from leeching into the system. In that case, the coolant liquid does not provide meaningful cooling to the cover plate 502.

The coil tray 504 contains the inductive coil windings needed for formation of the open-core transformer. Normally acting as the primary coil, the windings can experience hundreds of amperes of alternating current at thousands of volts. The coil tray 504 may be constructed from turns of woven Litzendraht (Litz) wire to reduce AC losses.

The coil tray 504 acts as both a physical holder for the turns of Litz wire and also transmits the heat generated by the coil during operation, as enabled by a potting encapsulant for the coil. The material of the coil board must be physically and mechanically stable at operating temperatures, be transparent to magnetic flux, and be highly heat conductive relative to its electrical isolation.

The backing core layer 505 consists of a material (nominally ferrite) with high magnetic permeability, low remanence and low coercivity. The backing core 505 serves to redirect magnetic flux away from the lower levels of the ground coil assembly 501. The backing core 505 also generates heat during operation.

The efficiency of the high magnetic permeability material changes with operating temperature. The second cooling layer 507, with its already heated coolant, serves to manage this heat requirement.

The gap layer 506 serves to further reduce eddy current losses (for additional details see United States Pat. Pub No. 20220037924, “Efficiency Gains Through Magnetic Field Management,” which is incorporated herein by reference). The gap layer 506 may consist of air or be filled with a magnetically transparent and thermally conductive structural material.

The second cooling layer 507 lies under the gap layer 506 and above the electronics board 508. The electronics board 508 may be a printed circuit board with resident capacitors and other discrete circuitry.

A third cooling layer 509 lays under the electronics board 508 and serves to cool the electronics board 508 and the foundational layer 510. Since the coolant has already been heated in the first cooling layer 503 and the second cooling layer 507, environmental temperature changes (such as the freezing of the pavement and ground surrounding the ground coil assembly 501) may be moderated, increasing the electronics service lifespan.

The foundational layer 510 may be used for structural anchoring of the internal ground coil assembly 501 components and also may be used for the power and coolant interconnections. The foundational layer 510 may include a metallic emissions shield to convert any stray magnetic flux to heat via eddy current heating rather than allowing the magnetic flux to escape.

The various layers of the ground coil assembly 501 described herein are divided functionally and, in some cases, may be combined with another, adjacent layer. For instance, the first cooling layer 503 and the coil tray 504 may be combined as combined element 511, backing core layer 505, gap layer 506 and second cooling layer 507 may be combined as combined element 512 if the gap distance is maintained. Additionally, the electronics board 508, third cooling layer 509, and foundational layer 510 could be combined as combined element 513 provided that the necessary structural support is not compromised. Each layer also may have one or more thermal sensors for tracking temperature and ensuring safety and reliability.

FIG. 6

For each modular GCA in a wireless charger, the coolant may enter at the top level between the cover and the inductive power coil. This is advantageous in that the coolant is at its minimum temperature at this point. Not only does the first pass absorb heat from the inductive power coil, but the first pass may also absorb heat rising from the lower levels of the GCA stack and from any solar or ambient heating of the cover. It will be further appreciated that the first cooling layer and Litz assembly may be isolated from the other layers to minimize any extra heating of the polymer carrier since the polymer carrier likely will be the first element to hit its thermal limit.

This first pass serves to keep the inductive power coil below the safe operational temperature threshold for WPT as set by standard IEC standard 61980, "Electric vehicle wireless power transfer (WPT) systems—Part 1: General requirements", and also serves to keep the cover below the safety threshold (nominally 140° F. (60° C.) as per ASTM C1055 "Standard Guide for Heated System Surface Conditions that Produce Contact Burn Injuries") or as per UL 2750 which sets a limit of 95° C. for non-metallic materials or as per IEC 61980 section 11.6.2, 'Permissible surface temperature of accessible parts of the WPT system'. Also, the coolant provides the pathway for heat to the cover, effectively melting potentially obscuring ice or snow in colder climes and seasons.

Coolant may flow continuously during charging operation and idle periods to maintain a nominal GA assembly temperature, pre-cool components for the next charging session, or to prevent excessively cold or hot temperatures or rapid temperature fluctuations that could reduce the service life of the GCA. Coolant pressure may be maintained by maintaining coolant flow during charging operation and idle periods to prevent pressure cycling preventing wearing of hydronic components.

Figure 6:
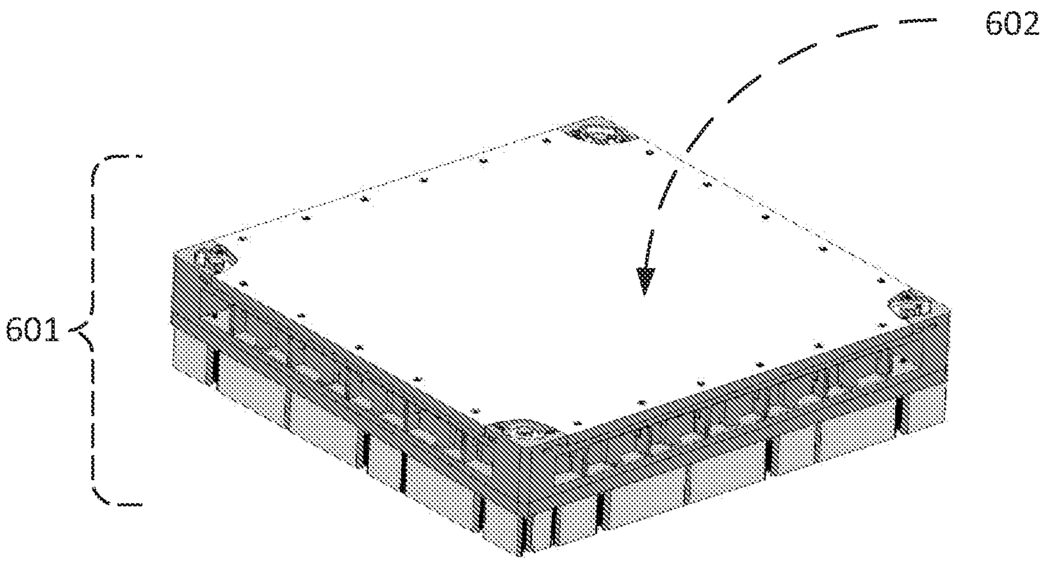
FIG. 6 is a diagram illustrating a top view of the WPT ground charger module of FIG. 5 with a cover in a sample configuration.

FIG. 6 is a diagram illustrating a top view of the Ground Coil Assembly (GCA) 601 of the WPT ground charger module of FIG. 5 with a cover 602 in a sample configuration. The cover 602 serves to protect the GCA 601 from rain, snow, sun, chemical reactants, and mechanical loading. The cover 602 is necessarily magnetically transparent and as thin as possible, given the mechanical loading constraint, as to minimize the impact of increasing gap size (by the thickness of cover 602) between the primary and secondary coils during a charging session.

FIG. 7

Figure 7:
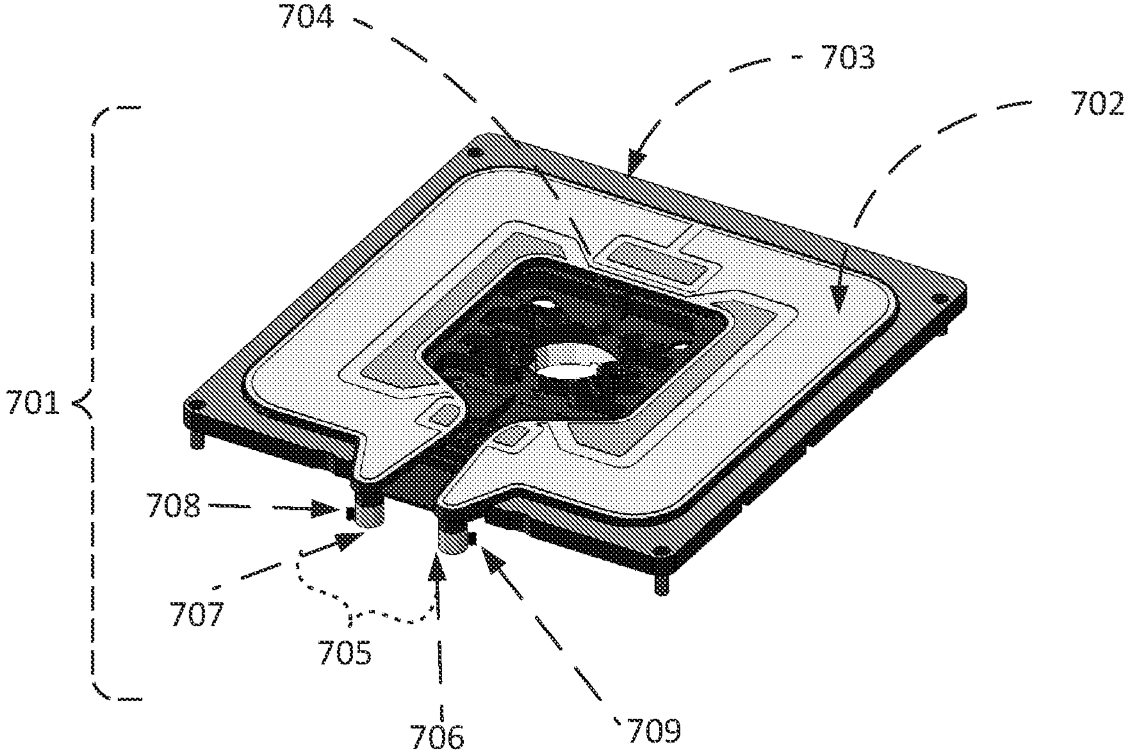
FIG. 7 is a diagram illustrating a Ground Coil Assembly of FIG. 6 with the cover removed to expose the first cooling layer in a sample configuration.

FIG. 7 is a diagram illustrating the GCA 601 of the WPT ground charger module of FIG. 5 with the cover 602 removed to expose the first cooling layer 701 in a sample configuration. The cooling channel 702 overlays the windings of the Litz wire coil (not shown). The cooling layer board 703 defines shape and volume of the cooling channel 702 and is fused with the Litz carrier tray 504 both to prevent coolant leakage and to maximize the heat transfer between the first cooling layer 701 and the Litz carrier tray 504.

The hole 704 accepts a central column that serves to help provide mechanical incompressibility to the cooling layer 701. The coolant plumbing 705 is located outside the area of the coil (shown by the area of the cooling channel 702) and offers both the egress 706 and ingress 707 ports for the coolant channel 702. Temperature sensors 708 and 709 are used to monitor the outcoming and inflowing coolant temperature. The first cooling layer 701 may be physically integrated with the coil carrier 801 as depicted in FIG. 8.

FIG. 8

Figure 8:
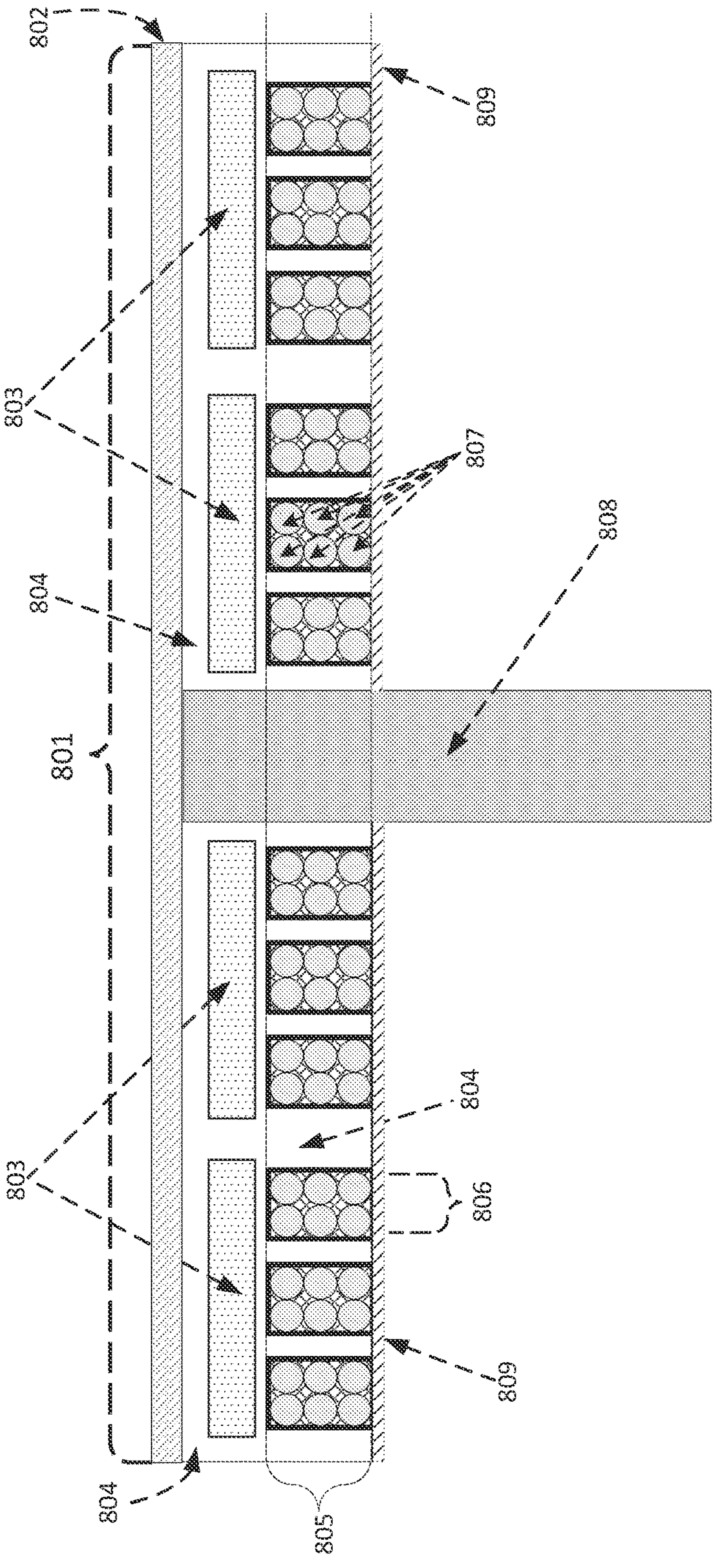
FIG. 8 is a diagram illustrating a cross-sectional view of the inductive coil and coil carrier of the Ground Coil Assembly module of FIG. 5 in a sample configuration.

FIG. 8 is a diagram illustrating a cross-sectional view of the inductive coil and coil carrier 801 of the GCA module of FIG. 5 in a sample configuration. The cover 802 and first cooling layer 803 are shown. The coil carrier tray 804 is made of a polymer material in this example, selected for incompressibility, temperature range, temperature conductivity and magnetic transparency. Since the first cooling layer 803 is integrated into the coil carrier tray 804, the polymer material is selected to be chemically inert with the water/glycol coolant used. The coolant pressure is defined as 'low pressure' which in this application is limited to 10-30 PSI above ambient pressure.

The coil tray material requirements include electrical conductance (i.e., the coil tray material is substantially electrically non-conductive), magnetic transparency, thermal conductivity, thermal resistance, temperature range, and chemical compatibility with the coolant.

Electrical Conductance—The coil tray contributes to the overall voltage protection of 7 kV in combination with other materials surrounding the inductor such as the Litz wire insulation and potting material.

Magnetic Transparency—A magnetically transparent material used for the coil carrier 801 does not significantly interact with externally applied static or dynamic magnetic fields or produce its own appreciable field in the presence or absence of such fields. The magnetically transparent material has a relative permeability very close to one and an electrical conductivity small enough that the skin depth for frequencies of interest is several orders of magnitude greater than the minimum thickness and inter-channel width of the structure of the coil carrier 801.

Temperature Range—the coil tray material has an operating temperature range of −40° C. to 125° C. able to endure thousands of hours at the maximum rated temperature (135° C.).

Thermal Conductivity—the coil tray material exhibits >1 W/m-K in the primary direction of heat transfer.

Chemical Compatibility—the coil tray material may be in direct contact with mixed ethylene glycol (or propylene) and water solution (e.g., a 50%:50% mix) without long-term chemical degradation.

Manufacturability—the coil tray material may be formed by injection molding, compression molding, die extrusion, and machining by milling.

Aging—the coil tray material may endure thermal aging without oxidative, mechanical, or thermal degradation with an RTI of >130° C. The Relative Thermal Index (RTI) is defined by UL standard 746B standard "Polymeric Materials—Long Term Property Evaluations". Both the electrical RTI and mechanical RTI apply to the coil tray material in its dual role as structure for the (electrical) inductive coil and the (liquid) first cooling channel.

Despite the repeated thermal cycling and sustained temperatures at both ends (i.e., cold and hot) ends of the thermal cycle, the coil tray material cannot experience warping and dimensional changes such that the coil is altered in pitch or yaw in respect to the baseline, nor can such physical changes (e.g., shrinkage) instigate leaks in the first cooling layer integrated into the coil tray assembly for the service life of the ground charger.

Other material properties like density, elastic modulus, and strength are relevant material characteristics, but such impact of such properties is highly dependent on the part construction and geometry which can be adjusted, moderated, or mitigated by changes to the physical and mechanical design whereas the listed material requirements are innate to the material(s) composition of the coil tray and constrain the material selection.

The inductive coil 805 in this example may be comprised of six concentric carrier channels 806 of six conductors each. The carrier channels 806 serve to contain the coil elements 807. Spaces in-between conductors 807 within the carrier channels 806 may be filled with electrically insulative, thermally conductive potting compound. Alternately, The coil carrier 801 may have one spirally configured channel in which the 1-to-n Litz wire is laid. Each Litz wire also may have its own ingress and egress from the coil carrier 801.

A central column 808 is provided as a load bearing member that offloads weight placed on the cover/lid 802 from the first cooling layer 803 and the coil carrier tray 804 to a foundational bottom (not shown) of the GCA 601.

A protective electrically insulative, thermally conductive layer 809 underlays the coil carrier tray 804, around the central column 808. Beneath the protective layer 809 may be an air gap or a space filled with a magnetically transparent material as described in U.S. patent application Ser. No. 16/940,658, entitled "EFFICIENCY GAINS THROUGH MAGNETIC FIELD MANAGEMENT," filed Jul. 28, 2020.

FIG. 9

Figure 9:
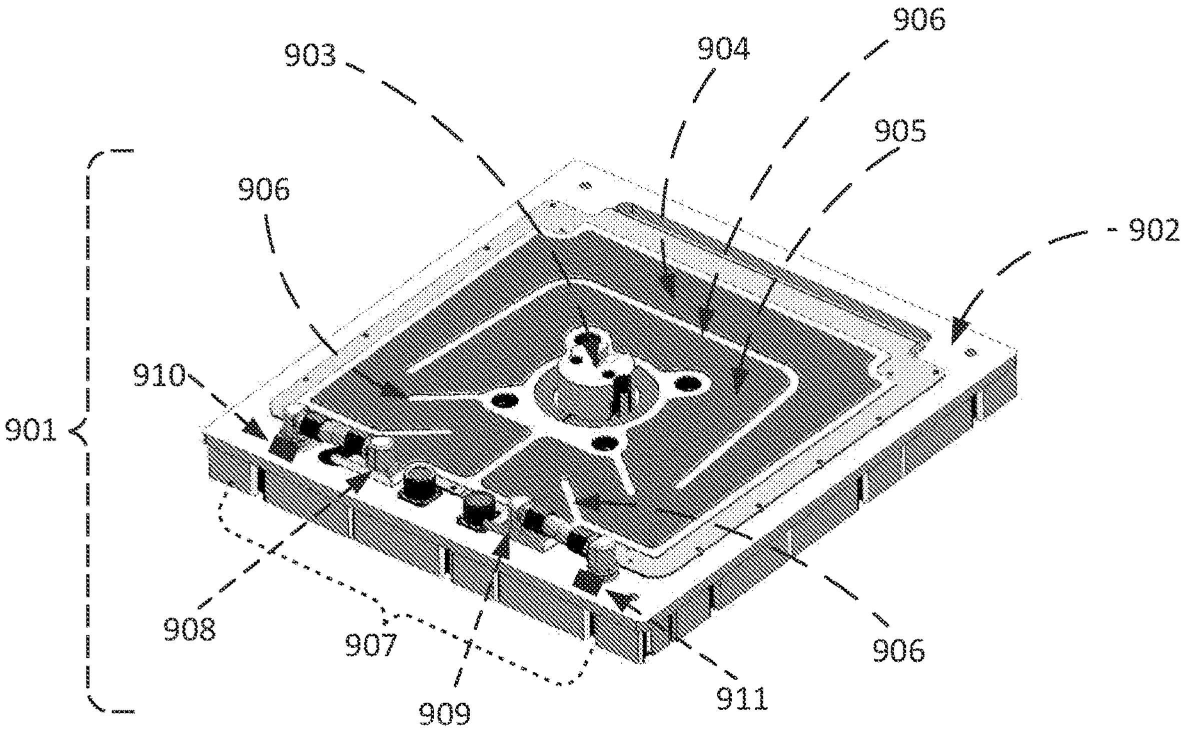
FIG. 9 is a diagram graphically illustrating a second cooling layer of the Ground Coil Assembly module of FIG. 5 in a sample configuration.

FIG. 9 is a diagram graphically illustrating a second cooling layer 901 of the GCA module of FIG. 5 in a sample configuration. The base 902 and the central column 903 serve to provide structure and incompressibility to the second cooling layer 901. Since the second cooling layer 901 is situated below the backing core layer 505 and a distance away from the coil, the second cooling layer 901 is substantially outside the magnetic field and more conventional thermally conductive materials (e.g., metals) can be used. Since the second cooling layer 901 thickness is not as constrained as in the first cooling layer 701 thickness, more conventional heat exchanger designs can be used, for instance, the second cooling layer 901 heat exchanger may be in the form of cold plate(s). Cold plates are typically made from metal (e.g., copper, aluminum), with integral flow paths for the fluid coolant to flow through.

As the plates absorb waste heat, they dissipate it through the flow paths using liquid cooling. The cold plate(s) may be constructed using roll-bond, friction stir welding, vacuum brazing, laser welding, die casting, or gun drilling to form the plate and flow paths. Hybrid cold plate heat exchangers such as those with aluminum cold plates with copper tube as flow paths can be used in this application as can cold plates with micro-channel liquid flow paths formed by extrusion.

The cold plate can be augmented with the addition of heat pipes for focused heated "hot spot" areas or connection to neighboring electronics (e.g., PCBs, heat sink connections bonded over or under heat producing integrated circuit (IC) chips).

In this example of the second cooling layer 901, the cooling channel is split into an outer channel 904 and an inner channel 905 to provide for thermal expansion of the coolant. The ribs 906 separating the outer channel 904 and inner channel 905 provide structural reinforcement for the walls when the cooling channels 904 and 905 are pressurized to keep the second cooling layer 901 from deforming. The ribs 906 also distribute the flow uniformly to evenly cool the ferrite surface of the adjacent layer. The coolant channels should be free of air voids and filled with fluid so that no expansion volume is available. The expansion headroom for the system may be provided at the cooling cabinet reservoir tank (e.g., thermal expansion tank 419 in FIG. 4), for example. The external plumbing 907 is mechanically supported by, and passes though, the frame 902. The coolant egress 908 and coolant ingress 909 are handled by connections with the external plumbing 907. Outflowing coolant temperature is monitored by a temperature sensor 910. Inflowing coolant temperature is monitored by a temperature sensor 911. Alternatively, sensors may be provided only at the external inlet/outlet ports. Wiring connected to the coolant temperature sensors 910 and 911 is not shown.

FIG. 10

Figure 10:
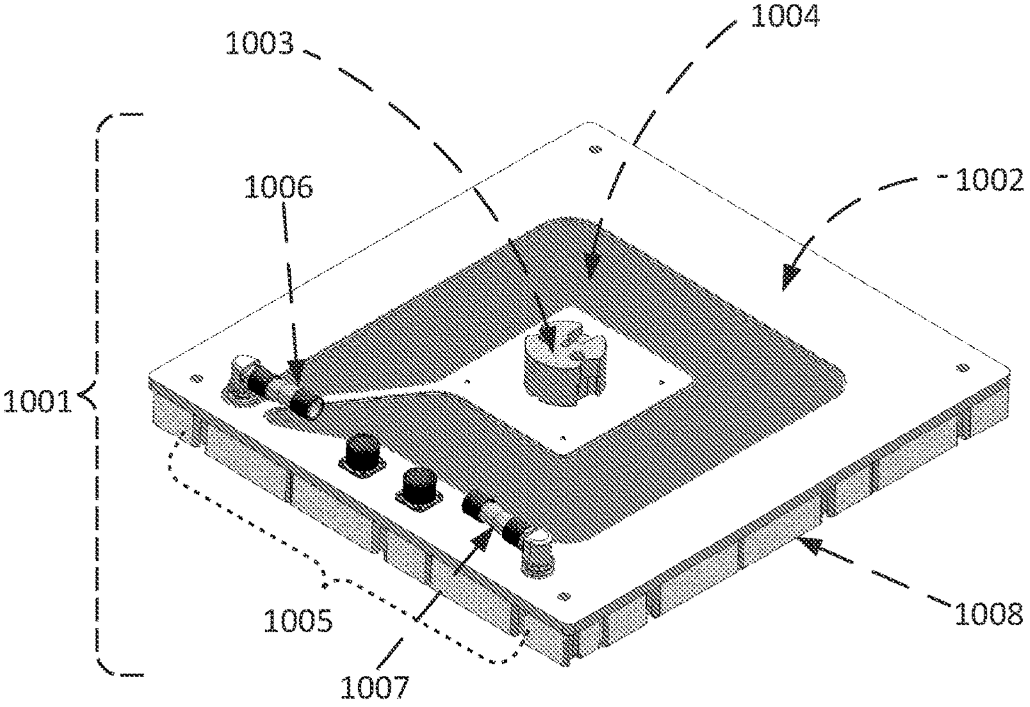
FIG. 10 is a diagram illustrating a third cooling layer and a cold plate of the Ground Coil Assembly module of FIG. 5 in a sample configuration.

FIG. 10 is a diagram illustrating a third cooling layer 1001 and a cold plate of the GCA module of FIG. 5 in a sample configuration. At the third cooling layer 1001, magnetic flux generated by the coil layer is minimal and conventional; therefore, metallic materials may be used in the construction without significant eddy current heating.

The base 1002 and the central column 1003 structures serve to provide structure and incompressibility to the third cooling layer 1001. The cooling channel 1004 is designed to match the area of the electronics board (not shown). Additional rod, fin, or mesh heat exchange structures (not shown) may be placed into the coolant channel 1004 to provide supplemental, enhanced cooling to circuitry mounted on the above electronics board with high thermal output. The external plumbing 1005 is supported by and passes though the frame 1002. The coolant ingress 1006 and coolant egress 1007 are handled via connections to the external plumbing 1005 in the cold plate 1008.

FIG. 11

Figure 11:
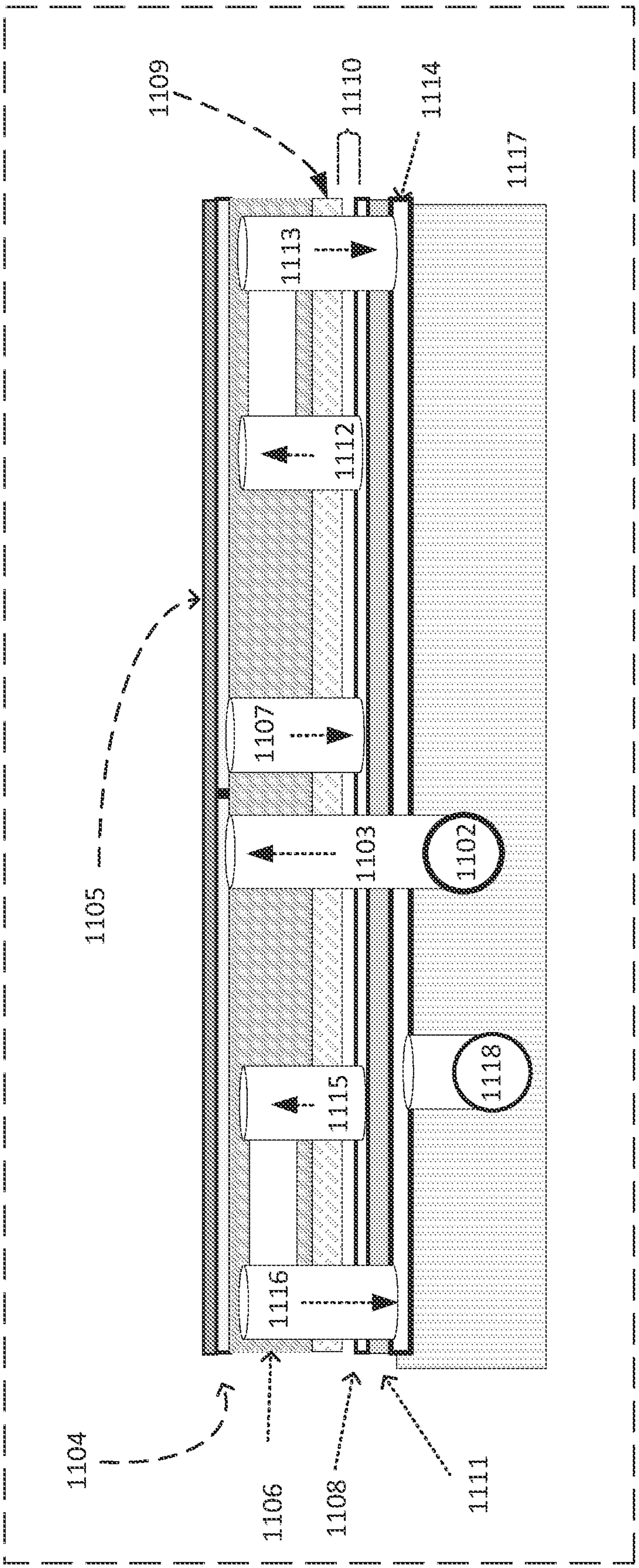
FIG. 11 is a diagram illustrating a cut-away side view of the Ground Coil Assembly module of FIG. 5 with coolant flow in a sample configuration.

FIG. 11 is a diagram illustrating a cut-away side view of the GCA module of FIG. 5 with coolant flow in a sample configuration. The side view of FIG. 11 graphically shows the three cooling layers and inter-layer plumbing. As illustrated, the GCA stack 1101 is cooled by a 3-pass, single loop thermal management system whereby the coolant enters the stack 1101 via an inlet port 1102 and is directed via an external (to the stack) riser 1103 to the first coolant layer 1104, which is situated between the cover plate 1105 and the coil carrier 1106.

The coolant circulates through the first coolant level 1104 to the external stack drain 1107 which directs the coolant to the second coolant level 1108. Use of the external riser 1103 removes the need to puncture the intervening structures (the coil carrier 1106, the backing core 1109, gap layer 1110, capacitor board 1111), and the external drain 1107 allows exiting of coolant flow without puncturing of the coil carrier 1106, backing core 1109, and gap layer 1110.

The second coolant level 1108 is situated below backing core 1109 and gap layer 1110 and immediately above the capacitor board 1111. Circulating through the second coolant layer 1108, the coolant is brought to a first external riser 1112 and drain 1113 which takes the coolant to the third coolant level 1114. A second external riser 1115 and drain 1116 also serve to convey coolant between the second 1108 and third 1114 coolant layers.

Situated below the capacitor board 1111 and above the assembly foundational backplate 1117, the third coolant level 1114 drains to the outlet port 1118 of the 3-pass, single cooling loop.

FIG. 12

Figure 12:
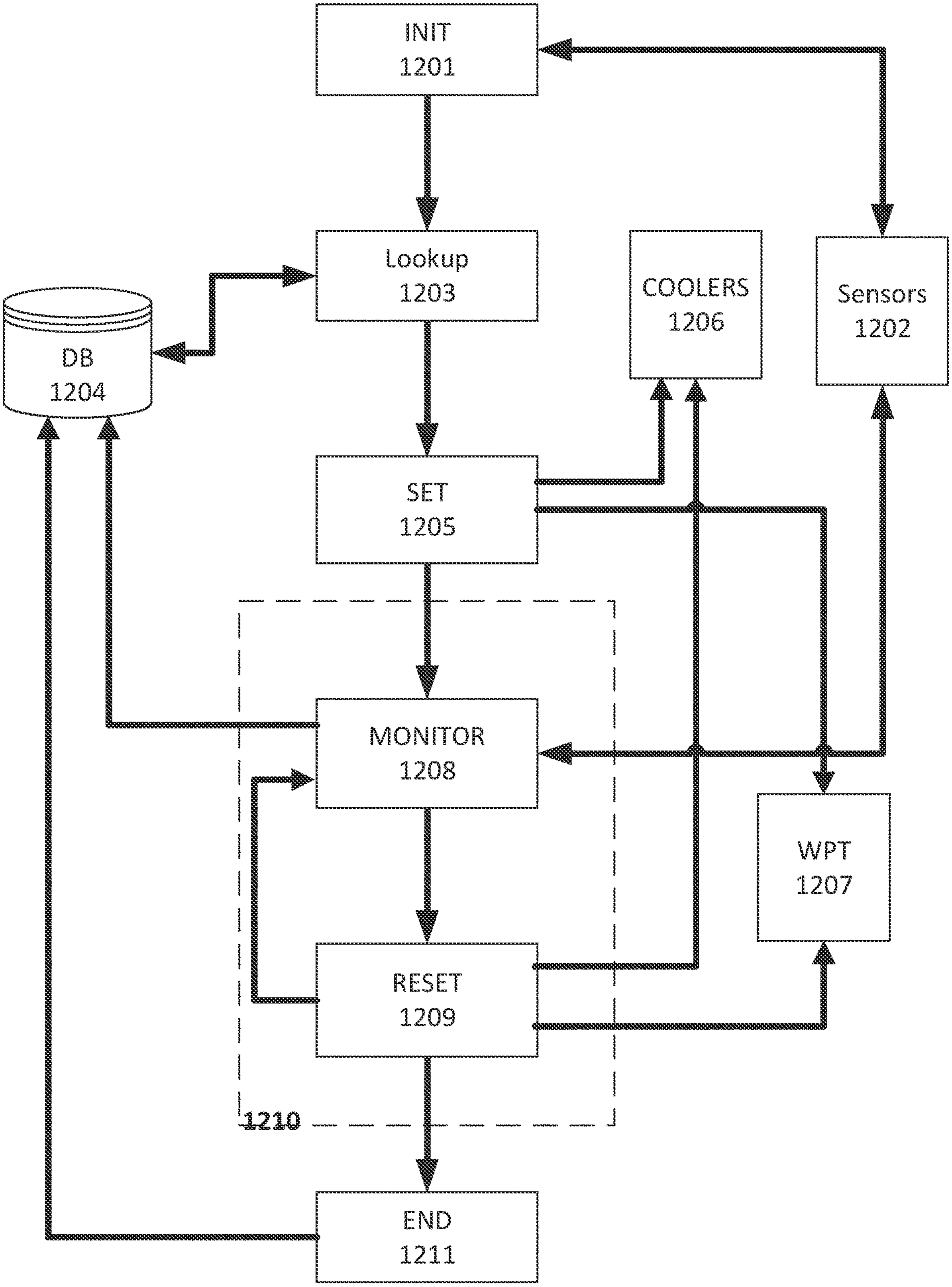
FIG. 12 is a flow chart illustrating a technique for thermal management of the WPT ground charger of FIG. 5 in a sample configuration.

FIG. 12 is a flow chart illustrating a technique for thermal management of the WPT ground charger of FIG. 5 before, after, and during a charging session in a sample configuration. In a sample configuration, a thermal controller (not shown) includes a processor that executes instructions to manage the temperature of the ground coil assembly configurations described herein.

During Initialization 1201, in response to a charging request, the WPT system collects current sensor data from the WPT temperature sensors 1202. Ambient air temperature, temperature of the GCA enclosure, coolant temperatures at multiple positions in the cooling loop are collected. The combination of flow rate, pressure, or temperature measurement is collected and then used for equalizing coolant flow to each pad. The collected sensor readings are compared during the Lookup 1203 phase with the temperature model uploaded from the database 1204. The collected sensor readings are also downloaded to the database 1204 for post-processing and model refinement.

The cooling profile is SET 1205 once the cooling profile needed to best match the collected sensor data and EV charging request parameters (e.g., current delivery requested, state-of-charge (SoC)) is found, estimated, or computed. Calculations may be made on the charging request parameters and historical charging information on the present EV or a model of the EV class may be considered in computation of the cooling profile. Since the EV may elect to prematurely end the charging session before a full SoC is attained, the model of the cooling profile may be considered the worst case for cooling.

Cooling resources (COOLERS 1206) are activated and the WPT 1207 is given the signal to commence charging in charging session 1210. The charging session 1210 includes a MONITOR 1209 and a RESET 1209 phase. The progression between MONITOR 1209 and RESET 1209 may be a looped operation or an interrupt driven process where RESET 1209 is called on exception.

During the charging session 1210, the WPT will MONITOR 1208 the sensors 1202 and compare sensor readings to the predictions and thresholds set in the cooling profile. The obtained sensor readings will also be uploaded to the database 1204 for future analysis and modeling. Deviations from the temperature model requiring adjustments to the coolant temperature, fan speeds, and addition or removal of passive, active, or semi-active cooling elements will be dealt with during RESET 1209. A controller (not shown) may signal the COOLERS 1206 with instructions for adjustments. Unexpected or severe deviation (e.g., a temperature threshold exceeded) from the cooling profile will cause RESET 1209 to send instructions to the WPT 1207 to suspend charging, and thereafter the RESET 1209 may send subsequent instructions to the COOLERS 1206 for a graceful recovery wherein the charging session 1210 may be continued after a delay for cooling.

The thermal controller also may be allowed change the current supplied to the ground charger coil if increasing deviations from the charging profile are detected. Such a change in current supplied would move the charging session to a new profile during the RESET 1209 operation.

Additional cooling capacity (for instance, bringing online an active or semi-active radiator structure or engaging evaporative or refrigerative cooling capacity) may be used to further chill the coolant in the case of a RESET. Also, the controller (not shown) may implement machine learning algorithms to create or modify a charging cooling profile based on previously acquired and newly acquired data (i.e., training data) to make better predictions of cooling needs.

If the charging session 1210 ends normally, or an exception cannot be recovered gracefully, the charging session 1210 will END 1211. All data concerning the charging session (e.g., duration, charging profile, temperature model, deviations to the model, exception events, raw temperature, and pressure data) is uploaded to the database 1204.

Typically, the flow in low pressure (no more than 30 PSI (~207 kiloPascals) over ambient atmosphere pressure), low velocity, low-viscosity (e.g., a water/glycol mixture) fluid cooled heat exchangers can be characterized as laminar, indicating that the fluid at the heat exchanger surface is of lower velocity when compared to the fluid velocity in the center of the coolant channel. As the shear gradient is smooth and continuous, very little mixing between the fluid near the heat exchanger surface and the center of the cooling channel occurs, resulting in poor thermal transport. In fact, the layer of fluid that is in contact with the heat exchanger can be viewed as almost motionless and is often referred to as the boundary layer. By introducing turbulence in the fluid, the boundary layer is disrupted which will then facilitate the mixing of the entire volume in the coolant channel, continuously removing heated coolant from the surface and dramatically improving the thermal rejection capability of the heat exchanger.

In a first example, a manifold formed by injection molding or additive engineering (3-D printing) is molded as a single piece using fixed or dissolvable cores or in multiple pieces that are then joined by thermal, chemical, or mechanical means. The manifold has provisions made for making positive thermal contact between the manifold and the inductive coil which is cooled by the manifold. In the mold, arrays of geometric 3-dimensional shapes that impinge upon the coolant flow can be created in the cooling channel(s) for the purpose of generating turbulence in the coolant and are hereafter referred to as "turbulators". Additionally, the turbulators increase the surface area of the manifold in contact with the fluid which further enhances the efficiency of the heat exchanger. It is important to note that as the turbulators are manufactured in the molding or printing operation using the material of the manifold, significant economic benefit is realized when compared to adding the turbulators at some other point in the manufacturing process.

FIG. 13

Figure 13:
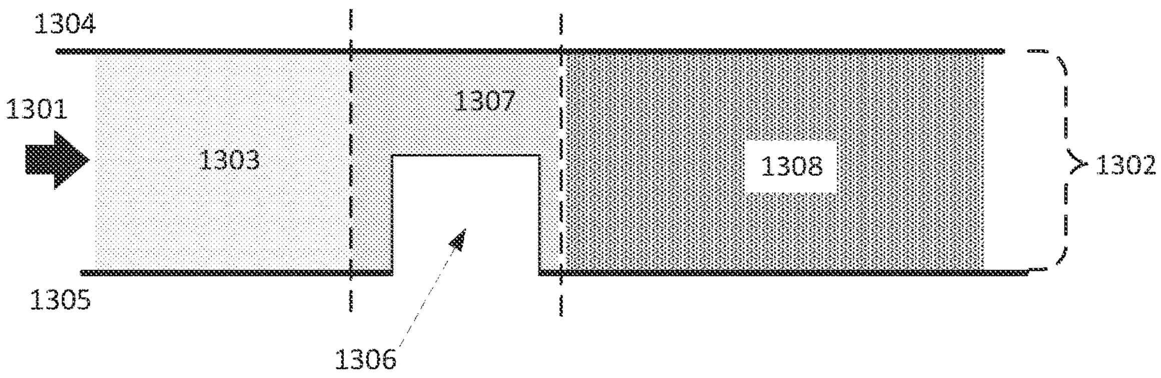
FIG. 13 is a diagram illustrating a cross-sectional side view of a cooling channel in the first cooling layer in a sample configuration.

FIG. 13 is a diagram illustrating a cross-sectional side view of a cooling channel in the first cooling layer. The coolant flow 1301 enters the cooling channel 1302 into a laminar flow zone 1303 with the top 1304 and bottom 1305 of the channel consisting of the thermally conductive, magnetically transparent Litz tray material.

The example turbulator 1306 depicted here as a cube is constructed of the same thermally conductive, magnetically transparent Litz tray material. The turbulator 1306 is preferably formed on the bottom and optionally the sides of the cooling channel 1302 where the heat generated by the inductive coil can be dissipated over the increased surface area channel bottom 1305 and of the turbulator 1306. Since the composition of the turbulator 1306 and channel bottom 1305 are of the same tray material, made at the same time, there is no heat transfer boundary internal to the tray material. The coolant flow 1301 running over and around the turbulator 1306 forms a transitional zone 1307, a mixture of laminar and turbulent flow.

Disruption of the coolant flow 1301 by the turbulator 1306 then creates a turbulent flow zone 1308, where vortices, eddies and wakes serve to disorder the coolant flow 1301, breaking up boundary layers and increasing heat transfer into the coolant flow 1301.

The top 1304 of the cooling channel will generally remain flat due to the limitation in thickness driven by the necessity to minimize coil-to-coil gap in the WPT system of inductive primary and secondary coils.

FIG. 14

Figure 14:
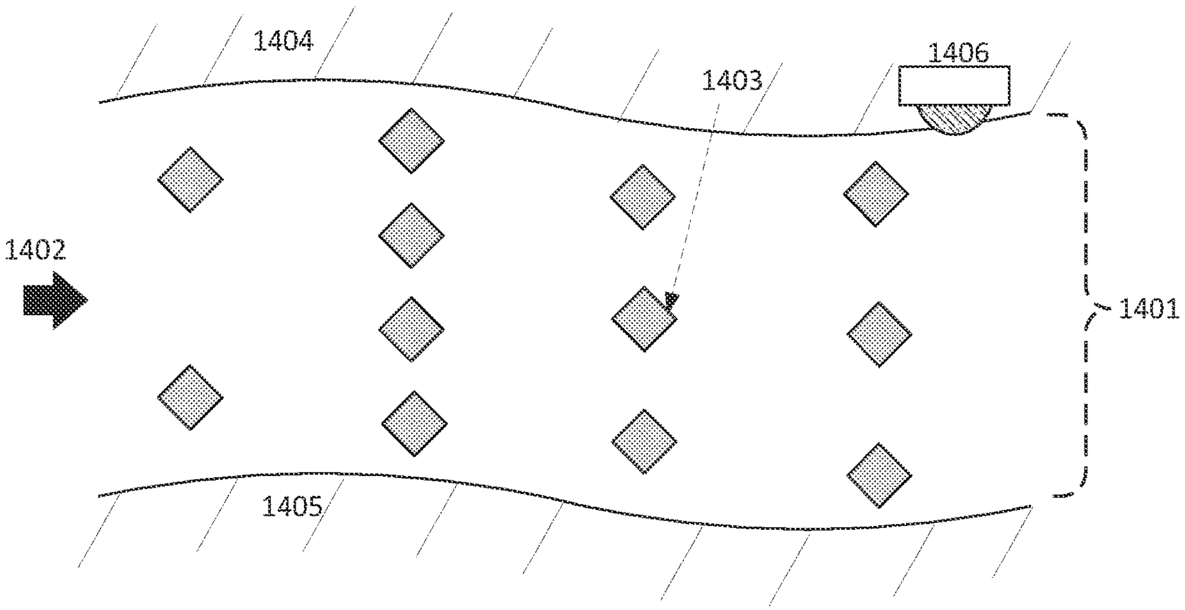
FIG. 14 is a diagram illustrating a cutaway top view of a cooling channel with coolant flow and distributed turbulators and curved sides in a sample configuration.

FIG. 14 is a diagram illustrating a cutaway top view of an example cooling channel 1401 with coolant flow 1402 with distributed turbulators 1403 and curved sides 1404 and 1405. In this example, the curved sides 1404 and 1405 yield increased surface heat dissipation area over straight sides. Depending on the desired turbulence, turbulator 1403 shape and volume, and the pressure drop designed for (using tools such as finite element analysis for turbulent flows), the sides 1404 and 1405 of the cooling channel may be straight, curved, or jagged in shape.

The size, number, distribution, and shape of the turbulators 1403 may be varied over the width and length of the cooling channel 1401. The ability to construct and position varied 3-dimensional symmetrical and asymmetrical in relief and/or sunken shapes (e.g., pins, fins, ramps, platonic shapes, pocket cavities, curved and recurved shapes, transverse ribs), through injection molding, additive manufacturing (i.e., 3-D printing), and post-forming machining allows tailoring of the turbulence and pressure drop over the operating flow velocity range.

An optional cavitation sensor 1406 allows for detection of bubble formation in the coolant flow 1402. When cavitation is detected, the pump pressure may be lowered to prevent damage to the polymer material used for the walls 1404 and 1405 of the cooling channel 1401 and the especially the sharp or thin features of the turbulators 1403.

CONCLUSION

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all the electronic operations described herein, or other aspects depicted in the accompanying drawings and detailed description below. Such systems and computer-readable media including instructions for implementing the methods described herein also constitute sample embodiments.

The processing functions described herein (e.g., with respect to FIG. 12) may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Those skilled in the art will appreciate that while the disclosure contained herein pertains to the provision of electrical power to vehicles, it should be understood that this is only one of many possible applications, and other embodiments including non-vehicular applications are possible. For example, those skilled in the art will appreciate that there are numerous applications where customers wait in queues, and it is desired to provide charging to customer electronic devices as the customer moves through the queue. For example, inductive portable consumer electronic device chargers, such as those (e.g., PowerMat™) used to charge toothbrushes, cellular telephones, and other devices may be managed as described herein. Accordingly, these and other such applications are included within the scope of the following claims.

What is claimed:

1. A ground coil assembly of a wireless power transfer (WPT) system, comprising:

a magnetically transparent cover plate exposed to the environment;

an inductive coil that generates heat during operation;

a backing core layer disposed beneath the inductive coil and having a magnetic permeability sufficient to redirect magnetic flux back towards the inductive coil;

a cooling system comprising a coolant inlet for receiving coolant, a coolant outlet for emitting coolant that has been heated by at least the inductive coil, a first cooling layer beneath the cover plate and above the inductive coil, the first cooling layer circulating the coolant from the coolant inlet, and a second cooling layer beneath the backing core layer and connected to the first cooling layer and the coolant outlet;

a gap layer between the backing core layer and the second cooling layer, the gap layer comprising a magnetically transparent and thermally conductive material and having a width sufficient to reduce eddy current losses; and an electronics board beneath the second cooling layer, wherein the cooling system further comprises a third cooling layer beneath the electronics board and connected to receive the coolant from the second cooling layer and adapted to circulate the coolant to cool the electronics board before providing the coolant to the coolant outlet.

2. The ground coil assembly of claim 1, further comprising a foundation layer beneath the third cooling layer for structural anchoring of the ground coil assembly to ground around the ground coil assembly and for housing power and coolant interconnections.

3. The ground coil assembly of claim 2, wherein the foundation layer includes a metallic emissions shield that converts stray magnetic flux to heat via eddy current heating rather than allowing the stray magnetic flux to escape the ground coil assembly.

4. The ground coil assembly of claim 1, further comprising plumbing connected to the coolant inlet and coolant outlet, wherein the third cooling layer comprises a cold plate including connections to the plumbing.

5. The ground coil assembly of claim 4, further comprising a central column that passes through the inductive coil, the backing core layer, and the cooling system, and a frame around the inductive coil, the backing core layer, and the cooling system, wherein the central column and frame are adapted to provide structure and incompressibility to the ground coil assembly.

6. The ground coil assembly of claim 5, wherein the plumbing is mechanically supported by and passes though the frame.

7. The ground coil assembly of claim 6, wherein the plumbing receives the coolant from the coolant inlet and directs the coolant to the first cooling layer and circulates the coolant through the first cooling layer to a drain that directs the coolant to the second cooling level.

8. The ground coil assembly of claim 7, wherein the plumbing circulates the coolant through the second cooling layer, directs the coolant to the third cooling layer, and drains the coolant from the third coolant level to the coolant outlet.

9. The ground coil assembly of claim 4, wherein the plumbing is exterior to the inductive coil and the backing core layer.

10. The ground coil assembly of claim 1, wherein the coolant inlet is disposed between the cover plate and the inductive coil.

11. The ground coil assembly of claim 1, wherein the inductive coil comprises a plurality of concentric carrier channels of conductors, and wherein spaces in-between conductors within the carrier channels are filled with an electrically insulative, thermally conductive potting compound.

12. The ground coil assembly of claim 1, wherein the second cooling layer is split into at least an inner cooling channel and an outer cooling channel separated by at least one rib that provides structural reinforcement when the inner cooling channel and outer cooling channel are pressurized.

13. The ground coil assembly of claim 1, further comprising a thermal controller that executes instructions to provide thermal management before, after, and during a charging session.

14. The ground coil assembly of claim 13, further comprising a database and at least one temperature sensor, wherein the thermal controller receives current temperature readings from the at least one temperature sensor and executes instructions to compare the current temperature readings with a temperature model uploaded from the database.

15. The ground coil assembly of claim 14, further comprising at least one cooling element, wherein the thermal controller executes instructions to set a cooling profile in accordance with charging request parameters, to activate the at least one cooling element, and to signal the inductive coil to commence charging in a charging session.

16. The ground coil assembly of claim 15, wherein during the charging session the thermal controller executes instructions to monitor current temperature readings from the at least one temperature sensor, compare the current temperature readings to the cooling profile, and to at least one of adjust a temperature of the coolant, activate or deactivate the at least one cooling element, lower ground current used, or suspend charging in accordance with a result of the comparison of the current temperature readings to the cooling profile.

17. The ground coil assembly of claim 16, wherein the thermal controller executes instructions to provide data regarding the charging session to the database.

18. The ground coil assembly of claim 17, wherein the thermal controller executes instructions to implement machine learning algorithms to create or modify the cooling profile.

19. The ground coil assembly of claim 1, wherein the cover plate is thermally isolated from the inductive coil, backing coil layer, and cooling system.

20. The ground coil assembly of claim 1, wherein the inductive coil is disposed in a magnetically transparent polymer coil carrier that is chemically inert with respect to the coolant.

21. The ground coil assembly of claim 20, wherein the polymer coil carrier is electrically non-conductive, magnetically transparent, has an operating temperature range of −40° C. to 125° C., and exhibits greater than 1 W/m-K in a primary direction of heat transfer.

22. The ground coil assembly of claim 1, wherein at least one of the first and second cooling layers includes at least one geometric 3-dimensional shape that impinges upon coolant flow to generate turbulence in the coolant.

23. The ground coil assembly of claim 22, wherein the at least one of the first and second cooling layers comprises a plurality of geometric 3-dimensional shapes distributed over a length and width of a cooling channel for coolant flow in the at least one cooling layer, a size, number, distribution, and shape of the geometric 3-dimensional shapes being selected to create a desired turbulence and pressure drop in the cooling channel.

* * * * *